June 15, 1971      F. C. NEAL      3,584,404

TRACTOR SCOOP

Filed Dec. 27, 1968

INVENTOR.
FRANK C. NEAL
BY Christel + Bean
ATTORNEYS

United States Patent Office 3,584,404
Patented June 15, 1971

3,584,404
TRACTOR SCOOP
Frank C. Neal, 14 Lincoln St., Cattaraugus, N.Y. 14719
Filed Dec. 27, 1968, Ser. No. 787,364
Int. Cl. E02f 3/62
U.S. Cl. 37—118                                    1 Claim

ABSTRACT OF THE DISCLOSURE

A scoop attachment for a tractor having a frame adapted to be pivotally mounted on the frame of said tractor. A scoop is pivotally mounted on said frame about a generally horizontal axis located about ⅓ of the distance rearwardly from the leading or forward edge of the scoop and about ⅓ of the distance upwardly from the bottom wall. A handle is connected to the scoop for facilitating manipulation of the scoop by hand to perform a variety of operations.

BACKGROUND OF THE INVENTION

This invention relates to a scoop attachment for a tractor, and more particularly, to an improved scoop bucket attachment of the drag-scraper type.

Various forms of attachments have been designed for tractors to perform different earth conditioning and handling operations. Very often, elaborate power means coupled with suitable actuating and mounting devices are employed in conjunction with these attachments to perform such operations. Such auxiliary equipment is expensive and cumbersome so that it is not practical in many applications. For example, it would not be feasible to employ such auxiliary equipment in the well known house or garden type tractor. Moreover, the versatility of such equipment is limited.

SUMMARY OF THE INVENTION

It is an object of the present invention to provide a simple, manually operated scoop attachment for a garden type tractor.

It is another object of this invention to provide the foregoing with pivot means whereby an operator can, with a minimum of physical effort, manually pivot and maintain said scoop attachment in any desired position to perform various operations.

It is still another object of the present invention to provide an improved scoop attachment, which is simple and strong in construction, low in cost, rugged and durable in use, and which may be readily attached to and detached from existing tractors.

The foregoing and other objects, advantages and characterizing features of the present invention will become clearly apparent from the ensuing detailed description of an illustrative embodiment thereof, taken together with the accompanying drawing wherein like reference numerals denote like parts throughout the various views.

DESCRIPTION OF THE PREFERRED EMBODIMENT

Figure 1:
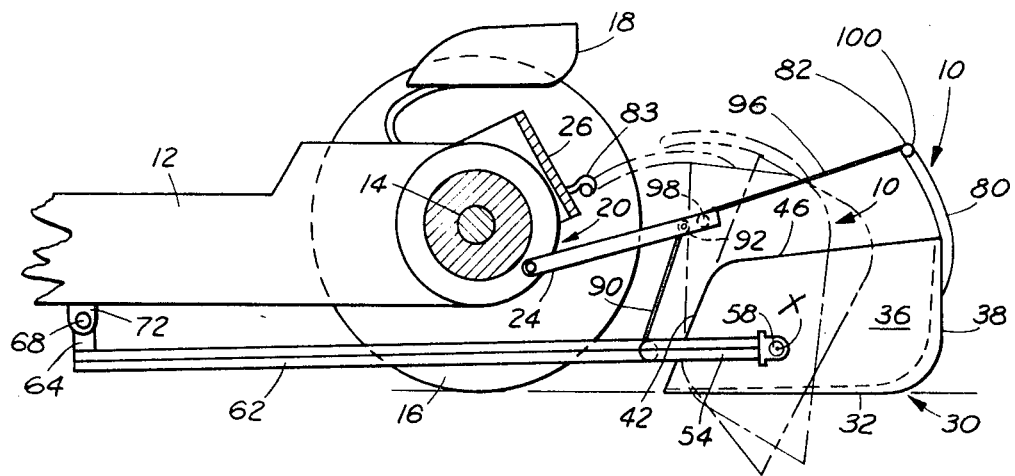
FIG. 1 is a fragmentary side elevational view of a tractor shown with a scoop attachment of the present invention operatively connected to the rear end of the tractor with the scoop attachment illustrated in dragging position in solid lines and in other scooping or digging positions in phantom.

Referring to the drawings, a preferred embodiment of this invention comprises a scoop attachment, generally designated 10, shown attached to the main frame 12 of a garden type tractor. Tractor frame 12 supports a rear axle assembly 14 journalling a pair of spaced ground engaging drive wheels 16. In addition, tractor frame 12 also supports an operator's seat 18 and a conventional three-point hitch or lift assembly, generally designated 20, including a pair of opposite side lower lift arms 24 and an upper center lift arm 26.

Scoop attachment 10 comprises a scoop bucket, generally designated 30, having a bottom wall 32, a pair of upstanding opposite side walls 34 and 36 interconnected at their rear ends by means of an end wall 38. Walls 32, 34, 36 and 38 all meet in rounded corners and merge into each other thereby eliminating any sharp bends.

Figure 2:
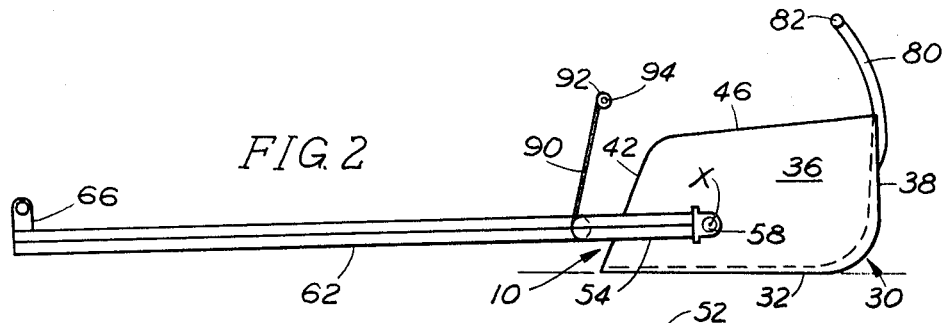
FIG. 2 is a side elevational view of the scoop attachment.
Figure 3:
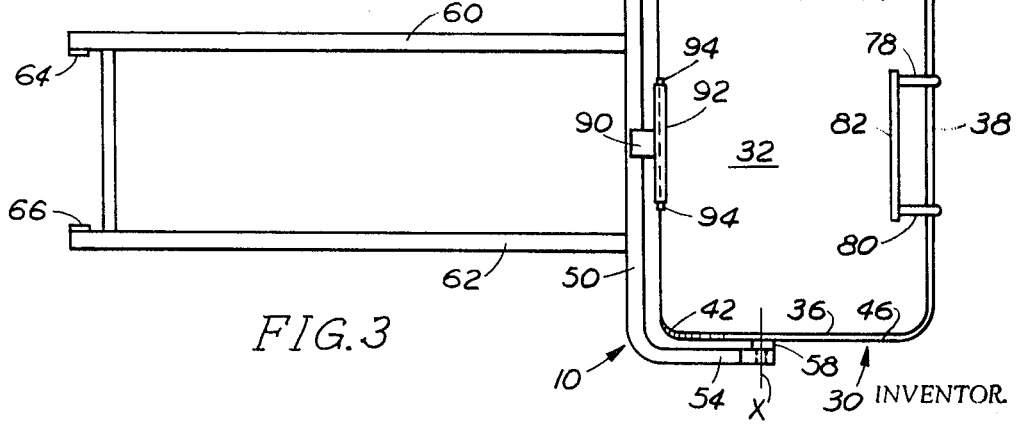
FIG. 3 is a top plan view of the scoop attachment of FIG. 2.

Side walls 34 and 36 have forward edges 40 and 42 inclined upwardly and rearwardly from the leading edge of bottom wall 32 and terminating in upper edges 44 and 46. Edges 44 and 46 also are inclined upwardly and rearwardly toward rear end wall 38. The terms top, bottom, upper, lower, forwardly, rearwardly and the like, as used herein, are applied only for convenience of description with reference to FIG. 2 and should not be taken as limiting the scope of this invention.

Scoop bucket 30 is mounted on a generally U-shaped frame 50 having opposite legs 52 and 54 and is journaled for pivotal movement on laterally extending studs 56 and 58 projecting outwardly from side walls 34 and 36. Studs 56 and 58 define a pivot axis about which scoop bucket 30 can pivot relative to frame 50.

A pair of spaced elongated arms 60 and 62 are welded or otherwise fixedly secured at their one ends to the bight portion of frame 50. The other ends of arms 60 and 62 are welded or otherwise fixedly secured to brackets 64 and 66 pivotally connected as by means of a transversely extending pin 68 to spaced lugs 72 depending from tractor frame 12. Thus, scoop bucket 30 is pivotally mounted relative to frame 50 about a pivot axis including studs 56 and 58 and also along with frame 50 about a pivot axis defined by pin 68.

Means are provided for facilitating manual manipulation of scoop bucket 30, such means comprising a pair of spaced extensions 78 and 80 secured at their one ends to rear wall 38, as by means of welding for example. Extensions 78 and 80 project upwardly from rear wall 38 and are arcuately curved toward seat 18. A cross bar or handle 82 is welded or otherwise fixedly secured to the distal ends of extensions 78 and 80. With this arrangement, handle 82 is disposed sufficiently close to the operator's seat 18 to enable the operator to easily grasp handle 82 for manipulating and controlling scoop bucket 30. A hook 83 is provided on lift assembly 20 for latching handle 82 when the scoop bucket 30 is in a generally upright position as shown in phantom in FIG. 1.

In order to attach scoop attachment 10 to the three point lift assembly 20, an elongated arm 90 is welded or otherwse fixedly secured at one end to the bight portion of U-frame 50 and is provided with a tubular cross bar 92 at the free end thereof. Pins 94 project axially outwardly from bar 92 and are adapted to be inserted in openings of spaced lift arms 24. Thus, lowering and raising of scoop bucket 30 about pivot pin 68 may be controlled by lift assembly 20, which also is manually operated by a handle (not shown).

An arm 96 is provided with a tubular cross bar 98 at one end thereof. The opposite ends of bar 98 are mounted in spaced openings provided in lift arms 24. Suitable fasteners, such as cotter pins for example, can be used to secure cross bar 98 to lift arms 24. Arm 96 has a hook portion 100 at the other end adapted to engage handle 82 to maintain scoop bucket 30 in a horizontal position as illustrated in solid lines in FIG. 1, thereby maintaining bottom wall 32 substantially parallel to the ground surface when bucket 30 is raised or lowered. Also, the engagement of hook portion 100 with handle 82 prevents clockwise movement of scoop bucket 30 in the event a load is concentrated in the rear portion of scoop bucket 30. When it is desired to pivot scoop bucket 30, arm 96 can be easily detached from handle 82 and pivoted out of the way. Also, arm 96 can be entirely removed by detaching bar 98 from lift arms 24.

A significant feature of this invention is in orienting pivot axis X in the optimum location so as to achieve the most advantageous mechanical leverage in order to manually manipulate scoop bucket 30 with the least amount of energy and effort. This is especially significant when bucket 30 is carrying a load or in a digging position. It has been found that the optimum location of pivot axis X relative to scoop bucket 30 is in a vertical plane rearwardly of the forward or leading edge of bucket 30 approximately ⅓ of the longitudinal distance from said leading edge to rear wall 38 and in a horizontal plane upwardly from bottom wall 32 approximately ⅓ of the vertical distance from said bottom wall to a point on edge 46 lying in said vertical plane. By orienting pivot axis X relative to scoop bucket 30 in the location described above, an operator can easily maintain scoop bucket 30 in any inclined earth engaging position by manual effort alone and readily pivot scoop bucket 30 in a clockwise direction about pivot axis X while said bucket is partially embedded in the ground surface as shown in FIG. 1 in phantom for example.

In a scooping or shoveling operation, the operator pulls handle 82 forward toward seat 18 to pivot scoop bucket 30 to an inclined position and holds it in such position while lowering scoop bucket 30 bodily about the pivot axis defined by pin 68 to insert the leading edge of scoop bucket 30 into a ground surface. When the shovel has penetrated the ground surface to the extent desired, the operator pushes rearwardly on handle 82 to pivot scoop bucket 30 in a clockwise direction. This operation is readily accomplished by hand due to the mechanical leverage obtained by the strategic location of pivot axis X. Thus, scooping, shoveling or digging can be effected without the necessity of any extraneous power actuators or power assist means.

Scoop bucket 30 can be employed as a drag bucket by merely pivoting scoop bucket 30 about pivot axis X so that the leading edge of bottom wall 32 engages a ground surface and bottom wall 32 extends upwardly substantially normal to the ground surface with handle 82 latched in hook 83 as shown in phantom in FIG. 1. Of course, a load can be transported by maintaining bottom wall 32 substantially parallel to a ground surface and slightly raised thereabove. In this position of scoop bucket 30, hook portion 100 of arm 96 can be engaged with handle 82. When a plow is attached to the forward end of tractor frame 12 for plowing earth material, debris, or snow, it has been found that a load in scoop bucket 30 serves to apply more traction to drive wheels 16 to render the plow more effective.

From the foregoing, it is seen that this invention fully accomplishes its intended objects and provides a simple, rugged, and durable scoop bucket which can be manually manipulated without the necessity of any cumbersome and costly power devices and attendant structure. An illustrative embodiment of this invention having been disclosed and illustrated it is to be understood that this has been done by way of illustration only.

What is claimed is:

1. An attachment for a tractor comprising: a frame; means connected at one end to said frame and pivotally mountable at the other end thereof about a first axis; a scoop bucket mounted on said frame for pivotal movement relative thereto about a second axis parallel to said first axis; said scoop bucket having a bottom wall and upstanding side walls interconnected at their rear ends by means of a rear wall; said bottom wall having a leading edge; said second pivot axis lying in a vertical plane disposed between said leading edge and said rear wall; said vertical plane is disposed rearwardly of said leading edge approximately ⅓ of the distance between said leading edge and said rear wall; said second pivot axis lying in a horizontal plane located upwardly from said bottom wall approximately ⅓ of the distance between said bottom wall and said upper edges of said side walls; extension means secured to said rear wall and projecting away therefrom with a handle mounted on the free end of said extension means; means latching said handle to a tractor hitch to maintain said scoop bucket in at least one operative position; first means securing said frame to a tractor hitch and second means secured to said tractor hitch and engageable with said handle in latching engagement therewith.

References Cited
UNITED STATES PATENTS

| | | | |
|---|---|---|---|
| 694,561 | 3/1902 | Livengood | 37—134 |
| 1,523,189 | 1/1925 | Floyd | 37—118A |
| 1,524,135 | 1/1925 | Jordan | 37—118A |
| 2,109,394 | 2/1938 | Livingston | 37—118A |
| 2,330,847 | 10/1943 | Seal | 37—117.5 |
| 2,721,404 | 10/1955 | Luke | 37—124 |
| 3,319,367 | 5/1967 | Lewis | 37—118 |

FOREIGN PATENTS

| | | | |
|---|---|---|---|
| 1,185,076 | 1959 | France | 37—118 |
| 966,430 | 1950 | France | 37—117.5 |

EDGAR S. BURR, Primary Examiner

U.S. Cl. X.R.

37—138